(12) United States Patent
Sato et al.

(10) Patent No.: US 8,002,137 B2
(45) Date of Patent: Aug. 23, 2011

(54) FUEL CARTRIDGE

(75) Inventors: Atsushi Sato, Kanagawa (JP); Yoshiaki Inoue, Aichi (JP); Kazuaki Fukushima, Kanagawa (JP); Jusuke Shimura, Kanagawa (JP); Yuto Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/270,040

(22) Filed: Nov. 13, 2008

(65) Prior Publication Data
US 2009/0169972 A1 Jul. 2, 2009

(30) Foreign Application Priority Data

Dec. 28, 2007 (JP) ................................. 2007-339155

(51) Int. Cl.
*B65D 47/36* (2006.01)
*B65D 51/00* (2006.01)
(52) U.S. Cl. .................. 220/526; 220/523; 220/562
(58) Field of Classification Search .................. 220/526, 220/523; 429/34, 35, 36
See application file for complete search history.

(56) References Cited

U.S. PATENT DOCUMENTS

| | | | | |
|---|---|---|---|---|
| 5,688,544 A | * | 11/1997 | Bolton et al. | 426/118 |
| 2001/0052523 A1 | * | 12/2001 | Rapson | 220/506 |
| 2003/0168458 A1 | * | 9/2003 | Lafferty et al. | 220/523 |
| 2004/0001989 A1 | * | 1/2004 | Kinkelaar et al. | 429/34 |
| 2006/0283864 A1 | * | 12/2006 | Zimmermann et al. | 220/507 |
| 2007/0154767 A1 | * | 7/2007 | Kimura et al. | 429/34 |
| 2007/0166575 A1 | * | 7/2007 | McLeod | 429/12 |
| 2007/0207354 A1 | * | 9/2007 | Curello et al. | 429/25 |
| 2008/0160350 A1 | * | 7/2008 | Chang et al. | 429/12 |
| 2008/0230401 A1 | * | 9/2008 | Zimmermann et al. | 206/6 |
| 2008/0233460 A1 | * | 9/2008 | Zimmermann et al. | 429/34 |
| 2008/0316249 A1 | * | 12/2008 | Aoki et al. | 347/19 |
| 2009/0110999 A1 | * | 4/2009 | Yamamoto et al. | 429/34 |

FOREIGN PATENT DOCUMENTS

JP 2006-224989 8/2006

* cited by examiner

*Primary Examiner* — Anthony Stashick
*Assistant Examiner* — Niki M Eloshway
(74) *Attorney, Agent, or Firm* — K&L Gates LLP

(57) ABSTRACT

A fuel cartridge is provided. The fuel cartridge capable of reliably suppressing fuel leakage and realizing improved safety. The fuel cartridge includes a cartridge body having a fuel supply port, and a seal member for directly closing the fuel supply port. The cartridge body has an atmosphere communication port, and the seal member directly closes the fuel supply port and the atmosphere communication port.

7 Claims, 8 Drawing Sheets

FUEL CARTRIDGE

CROSS REFERENCE TO RELATED APPLICATIONS

The present application claims priority to Japanese Patent Application JP 2007-339155 filed in the Japanese Patent Office on Dec. 28, 2007, the entire contents of which is being incorporated herein by reference.

BACKGROUND

The present application relates to a fuel cartridge used for a fuel cell.

A fuel cell has a configuration in which electrolyte is disposed between an anode electrode (fuel electrode) and a cathode electrode (oxygen electrode). Fuel is supplied to the anode electrode, and oxidant is supplied to the cathode electrode. An oxidation reduction reaction that the fuel is oxidized by the oxidant occurs, and the chemical energy of the fuel is converted to electric energy.

By keeping on supplying the fuel and oxidant, such a fuel cell can continuously generate power. The fuel cell is therefore expected as a new power source for a portable electronic device, different from primary and secondary cells of related art. Specifically, since a fuel cell generates power by using the chemical reaction between the fuel and the oxidant, by using oxygen in the air as the oxidant and keeping on supplying the fuel from the outside, the fuel cell can be continuously used as a power source unless a trouble occurs. Therefore, a miniaturized fuel cell may be a high-energy-density power source necessitating no charging and suitable for a portable electronic device.

As a method of replenishing fuel to the fuel cell from the outside, an interchangeable fuel cartridge is used. A fuel cartridge in which a container body that contains fuel is housed in a package member has been proposed (refer to, for example, Japanese Unexamined Patent Application Publication No. 2006-224989).

SUMMARY

However, in the technique described in Japanese Unexamined Patent Application Publication No. 2006-224989, there is the possibility that fuel leaks in the unopened package member due to vibration at the time of distribution or fluctuations in the environment temperature or atmospheric pressure. The technique has a serious shortcoming in safety.

It is therefore desirable to provide a fuel cartridge capable of reliably suppressing fuel leakage and realizing increased safety.

According to an embodiment, there is provided a fuel cartridge including a cartridge body having a fuel supply port, and a seal member for directly closing the fuel supply port.

In the fuel cartridge of the embodiment, the fuel supply port in the cartridge body is directly closed with the seal member. Therefore, the fuel supply port is reliably sealed, and fuel leakage is suppressed.

According to the fuel cartridge of an embodiment, since the fuel supply port in the cartridge body is directly closed with the seal member, the fuel leakage can be suppressed reliably, and safety is increased.

Additional features and advantages are described herein, and will be apparent from the following Detailed Description and the figures.

DETAILED DESCRIPTION

Embodiments of the present application will be described in detail hereinbelow with reference to the drawings.

First Embodiment

Figure 1:
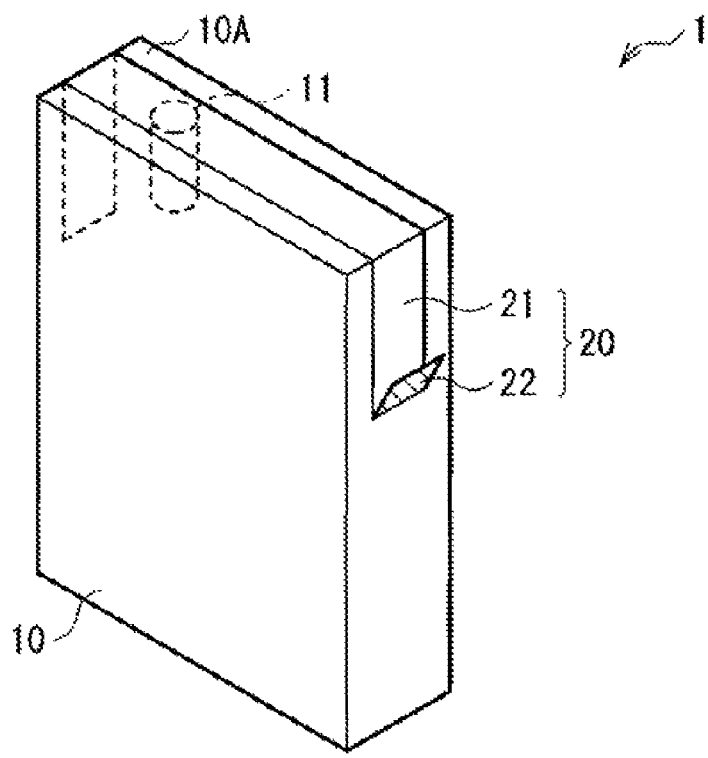
FIG. 1 is a diagram showing the appearance of a fuel cartridge as a first embodiment.
Figure 2:
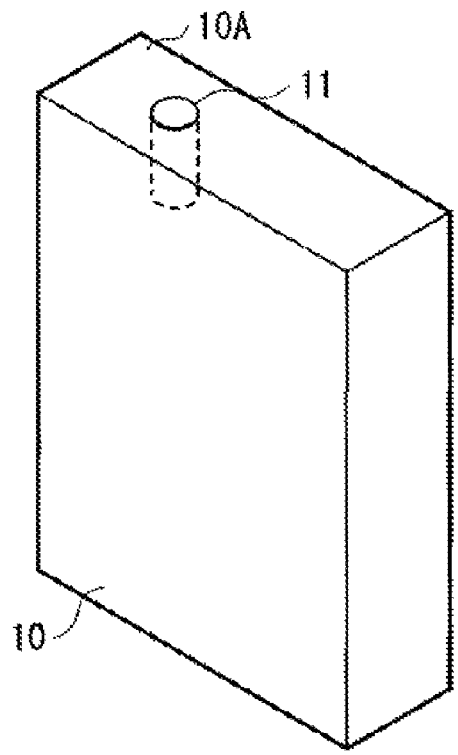
FIG. 2 is a diagram showing the configuration of the cartridge body illustrated in FIG. 1.

FIGS. 1 and 2 show the appearance of a fuel cartridge as a first embodiment of the present invention. A fuel cartridge 1 is an interchangeable fuel cartridge used for a fuel cell mounted as a power source of a portable electronic device such as a cellular phone, a notebook-sized PC (personal computer). The fuel cartridge 1 is constructed different from a power generation module (not shown) of the fuel cell, and is coupled to the power generation module of the fuel cell via a fuel supply pipe (not shown) or the like so that fuel is supplied. The fuel cartridge 1 contains, for example, methanol or the like as the fuel in a cartridge body 10 having a rectangular shape (rectangular parallelepiped shape).

The cartridge body 10 has, for example, a thickness of about 6 mm and is made of a metal material such as aluminum or stainless steel or a resin material such as PET (polyethylene terephthalate) or polypropylene (PP). In a top face 10A of the cartridge body 10, a fuel supply port 11 for injecting fuel into the cartridge body 10 or transmitting the fuel from the cartridge body 10 to a fuel cell (not shown) is provided. The fuel supply port 11 is directly closed with a seal member 20. With the configuration, in the fuel cartridge 1, fuel leakage can be reliably suppressed against vibrations at the time of distribution and fluctuations in the environment temperature or atmospheric pressure, so that safety can be increased.

The seal member 20 has, for example, a sealing part 21 adhered to the fuel support port 11 and its vicinity and an operating part 22 provided at one end of the sealing part 21. The sealing part 21 is adhered by a proper method such as thermal fusion bonding, ultrasonic fusion bonding, or resin adhesion using an adhesive in accordance with the shape and material of the cartridge body 10. The operating part 22 is provided to apply a peel force to the sealing part 21 at the time of peeling the sealing part 21 from the cartridge body 10. Since the internal pressure of the cartridge body 10 is increased by methanol contained in the cartridge body 10 which is warmed, preferably, the seal member 20 resists such rise in the internal pressure.

The seal member 20 is made of a material having a high barrier property against the fuel. Concretely, the seal member 20 is a resin film made of one material or a mixture of two or more materials selected from the group consisting of polyethylene, polyethylene terephthalate, ethylene-vinylalcohol copolymer resin, polyamide resin, polyglycolic acid, polypropylene, polyvinylalcohol, polyacrylonitrile, cellophane, polycarbonate, polystyrene, polyvinylidene chloride, and polyvinyl chloride. A laminate film obtained by adhering metal foil of aluminum or the like to the resin film may be also used. Further, a member obtained by forming a vapor deposition layer made of one or more materials selected from a metal such as aluminum, a metal compound such as aluminum oxide (alumina), and silicon dioxide (silica).

Figure 3:
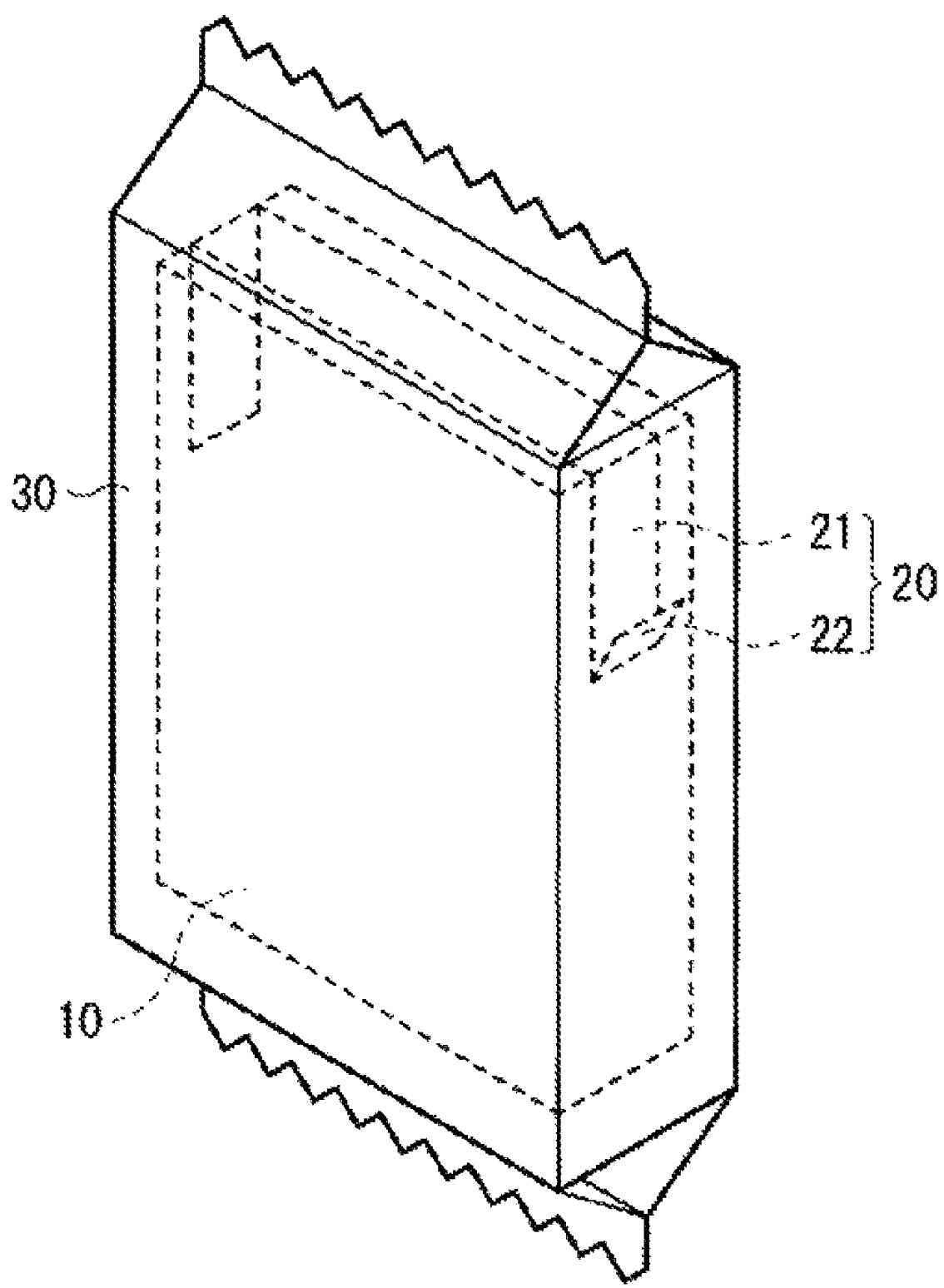
FIG. 3 is a diagram showing a state where the cartridge body illustrated in FIG. 1 is housed in a package member.

Such a cartridge body 10 is housed in a bag-shaped package member 30 as shown in FIG. 3. The package member 30 is provided to protect the cartridge body 10 at the time of distribution and prevent unintended peeling of the seal member 20 and the like. For example, the package member 30 has a thickness of 100 μm and is formed by an aluminum laminate film obtained by adhering a resin film, aluminum foil, and a resin film in this order. The package member 30 may not be provided depending on the structure of the seal member 20.

Preferably, the package member 30 is coupled to the operating part 22 of the seal member 20 for the reason that the peel force can be applied to the operating part 22 when the package member 30 is opened and separated from the cartridge body 10. Even if the fuel splashes to the outside at the time of peeling off the seal member 20 and opening the fuel support port 11, the splash fuel is received by the packaging member 30 so that the hands and cloth of the user and the like are prevented from becoming dirty.

For example, the fuel cartridge 1 may be manufactured as follows.

First, the cartridge body 10 made of the above-mentioned material is prepared, and fuel is injected from the fuel supply port 11. By adhering the sealing part 21 of the seal member 20 made of the above-described material to the fuel supply port 11 and its vicinity, the fuel supply port 11 is directly closed. As the method of adhering the seal member 20, a proper method such as thermal fusion bonding, ultrasonic fusion bonding, or resin adhesion using an adhesive may be used in accordance with the shape and material of the cartridge body 10.

Subsequently, as necessary, the package member 30 made of the above-described material is prepared to wrap the cartridge body 10 to which the seal member 20 is adhered. In such a manner, the fuel cartridge 1 shown in FIGS. 1 to 3 is completed.

In the fuel cartridge 1, the fuel supply port 11 is directly closed with the seal member 20. Consequently, accidental leakage in the package member 30 when the package member 30 is not opened is reliably suppressed, and safety improves.

Figure 4:
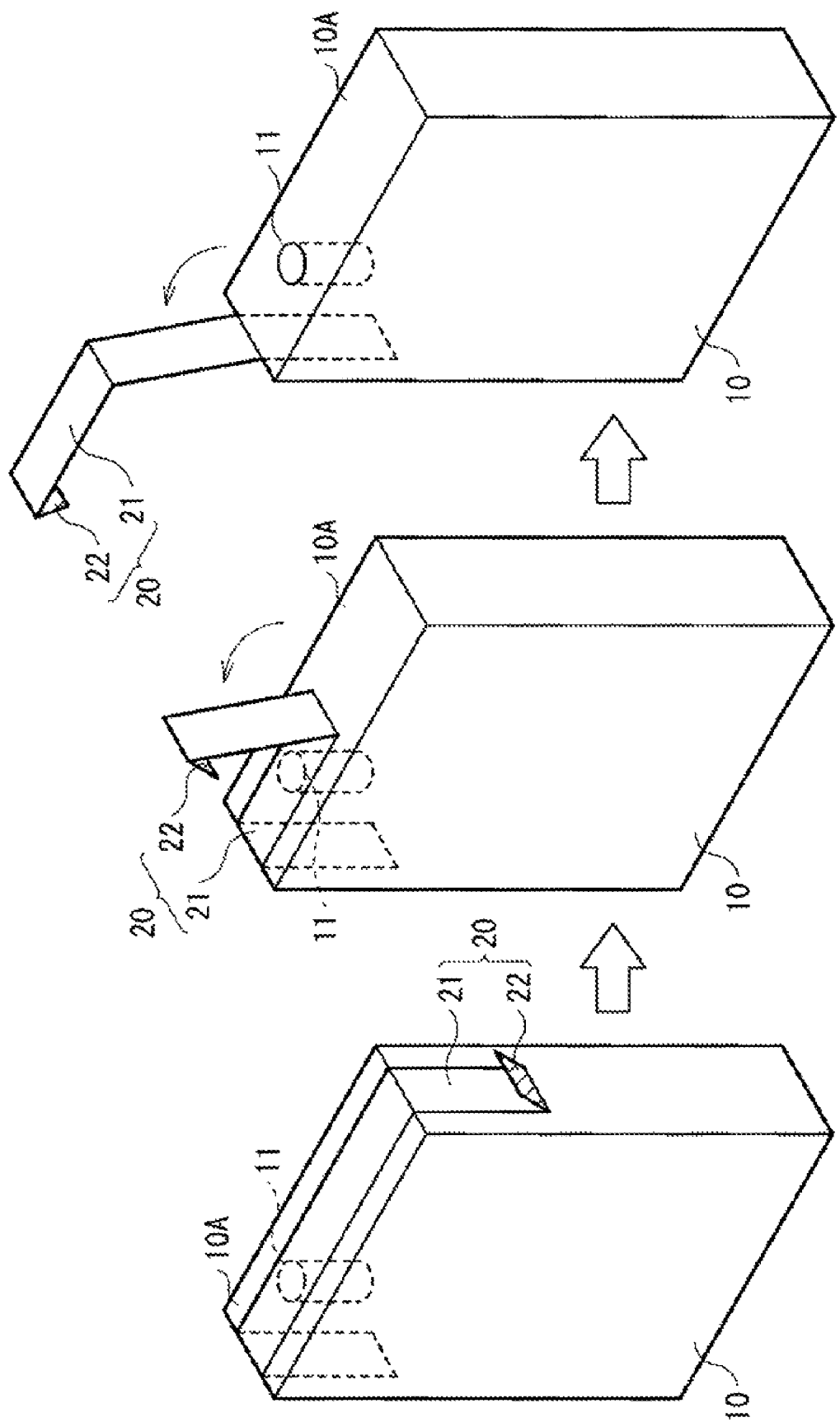
FIGS. 4A to 4C are diagrams showing a method of opening the fuel cartridge illustrated in FIG. 1.

At the time of opening the fuel cartridge 1, as shown in FIGS. 4A to 4C, by pulling the operating part 22 provided at one end of the sealing part 21 to apply the peel force to the sealing part 21, the seal member 20 is peeled from the cartridge body 10 and the fuel supply port 11 is opened.

In an embodiment, at the time of opening the fuel cartridge 1, the fuel supply port 11 in the cartridge body 10 is directly closed with the seal member 20. Consequently, fuel leakage can be reliably suppressed against vibrations at the time of distribution and fluctuations in the environment temperature or atmospheric pressure, and safety is increased.

Second Embodiment

Figure 5:
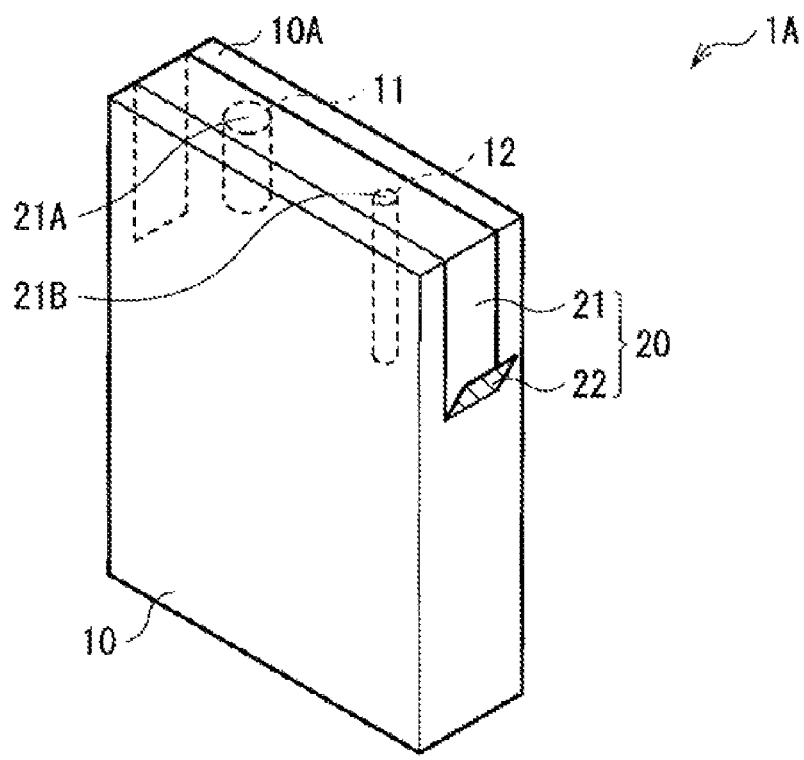
FIG. 5 is a diagram showing the appearance of a fuel cartridge as a second embodiment.
Figure 6:
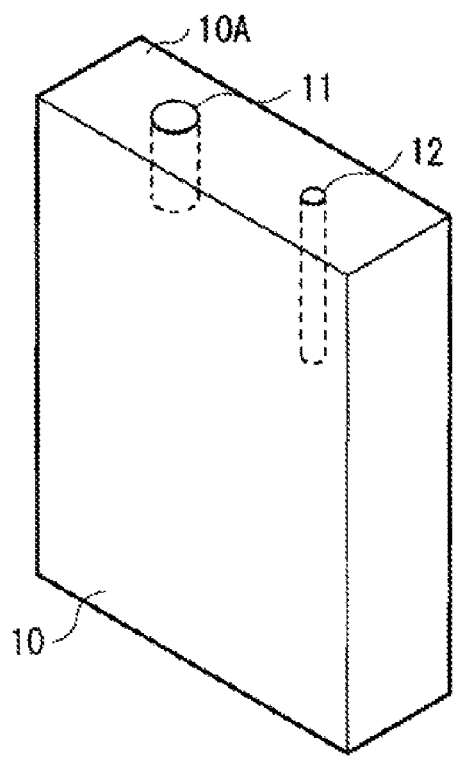
FIG. 6 is a diagram showing the configuration of a cartridge body illustrated in FIG. 5.

FIGS. 5 and 6 show the appearance of a fuel cartridge as a second embodiment of the present invention. In a fuel cartridge 1A, in the top face 10A of the cartridge body 10, the fuel supply port 11 and an atmosphere communication port 12 are provided. The fuel supply port 11 and the atmosphere communication port 12 are directly closed with the seal member 20. With the configuration, in a manner similar to the first embodiment, fuel leakage can be reliably suppressed and safety is increased. Except for the above, the fuel cartridge 1A of the second embodiment is constructed similar to that of the first embodiment and is manufactured similarly. Therefore, the same reference numerals are designated to the same components.

The sealing part 21 of the seal member 20 is one component member and covers both the fuel supply port 11 and the atmosphere communication port 12. The operating part 22 similar to that of the first embodiment is provided at one end of the sealing part 21.

Figure 7C:
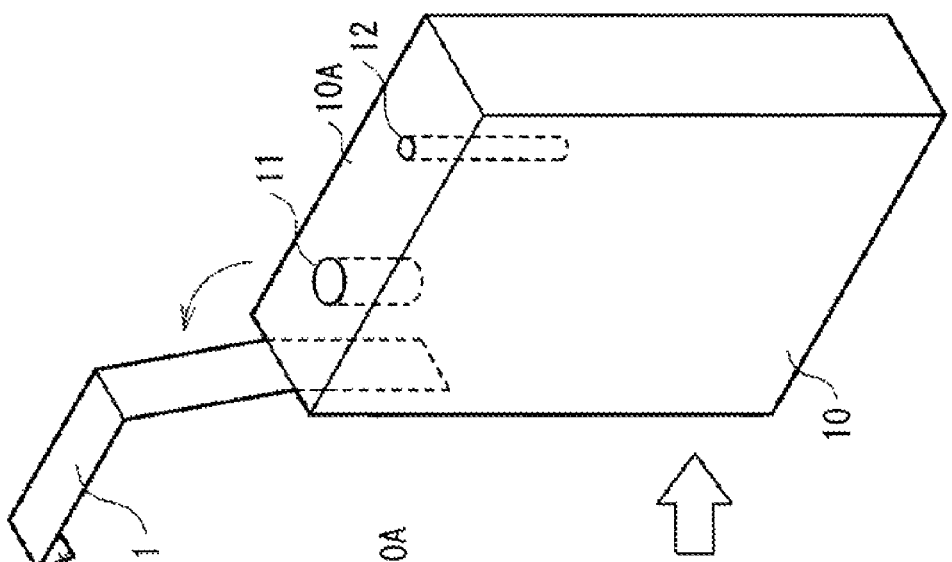
FIGS. 7A to 7C are diagrams for explaining a method of opening the fuel cartridge shown in FIG. 5.
Figure 7B:
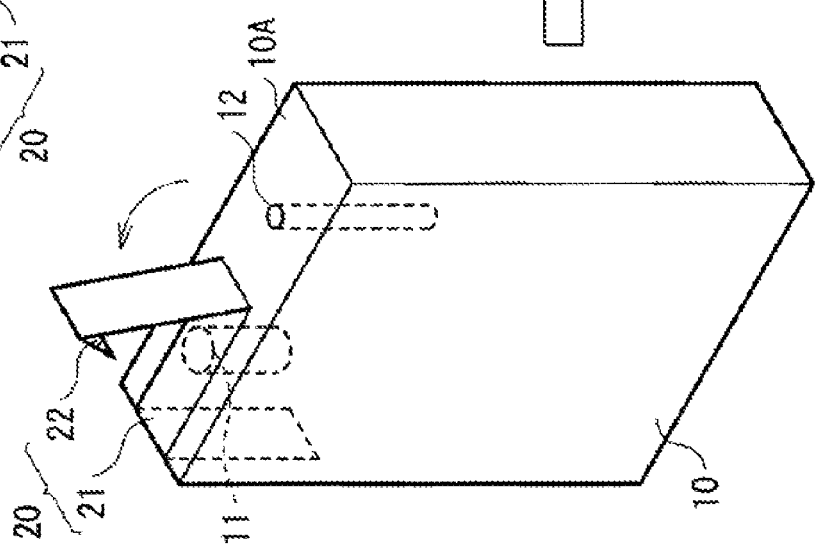
Figure 7A:
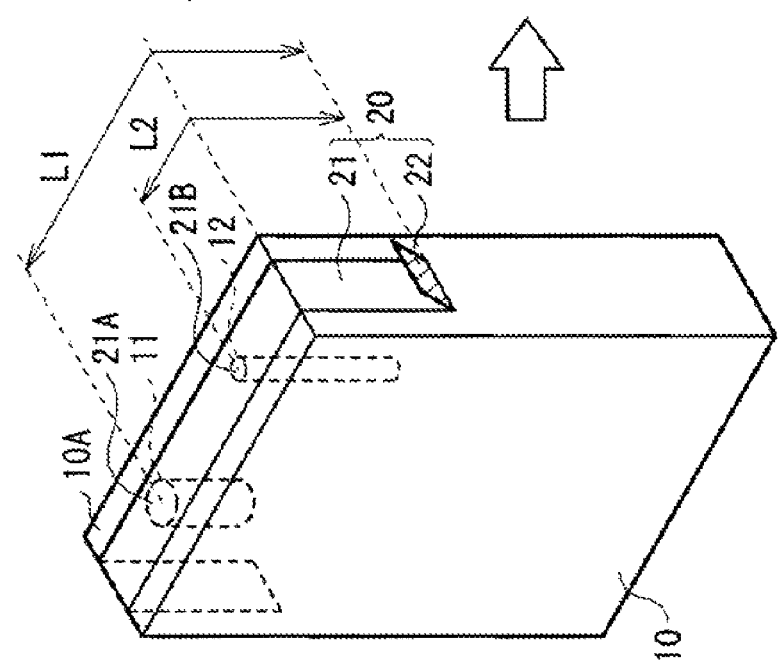

In the seal member 20, as shown in FIG. 7A, distance L2 between the operating part 22 and a second sealing part 21B for sealing the atmosphere communication port 12 is preferably shorter than distance L1 between the operating part 22 and a first sealing part 21A for sealing the fuel supply port 11. Peel resistance of the second sealing part 21B may be lower than that of the first sealing part 21A. With such a configuration, the peel force applied to the operating part 22 is transmitted more easily to the second sealing part 21B for sealing the atmosphere communication port 12 than to the first sealing part 21B for sealing the fuel support port 11. As shown in FIG. 7B, the atmosphere communication port 12 is opened earlier than the fuel supply port 11. Therefore, discharge of the fuel due to the internal pressure in the cartridge body 10 can be suppressed, and fuel leakage at the time of opening is prevented.

Such a cartridge body 10 is housed in the package member 30 (shown in FIG. 3 but not shown in FIGS. 5 to FIGS. 7A to 7C) similar to that of the first embodiment.

In the fuel cartridge 1A, the fuel supply port 11 and the atmosphere communication port 12 are directly closed with the seal member 20. Consequently, accidental leakage in the package member 30 when the package member 30 is not opened is reliably suppressed, and safety improves.

At the time of opening the fuel cartridge 1A, by pulling the operating part 22 provided at one end of the sealing part 21 to apply the peel force to the sealing part 21, the seal member 20 is peeled from the cartridge body 10. In the seal member 20, the distance L2 between the operating part 22 and the second sealing part 21B for sealing the atmosphere communication port 12 is set to be shorter than the distance L1 between the operating part 22 and the first sealing part 21A for sealing the fuel supply port 11. Therefore, the peel force applied to the operating part 22 is transmitted more easily to the second sealing part 21B for sealing the atmosphere communication port 12 than to the first sealing part 21B for sealing the fuel support port 11. Therefore, as shown in FIG. 7B, the atmosphere communication port 12 is opened first. After the internal pressure of the cartridge body 10 becomes equal to the atmospheric pressure, as shown in FIG. 7C, the fuel supply port 11 is opened. Therefore, even if the internal pressure of the cartridge body 10 is higher than the atmospheric pressure due to a change in the temperature or atmosphere pressure, there is no possibility of fuel leakage from the fuel supply port 11. Also in the case where gas such as air is sealed together with the fuel in the cartridge body 10, there is no possibility that the fuel leaks from the fuel support port 11 due to expansion pressure of the internal gas.

As described above, in a second embodiment, the fuel supply port 11 and the atmosphere communication port 12 in the cartridge body 10 are directly closed with the seal member 20. Consequently, like the first embodiment, fuel leakage can be reliably suppressed against vibrations at the time of distribution and fluctuations in the environment temperature or atmospheric pressure, and safety is increased.

Figure 8:
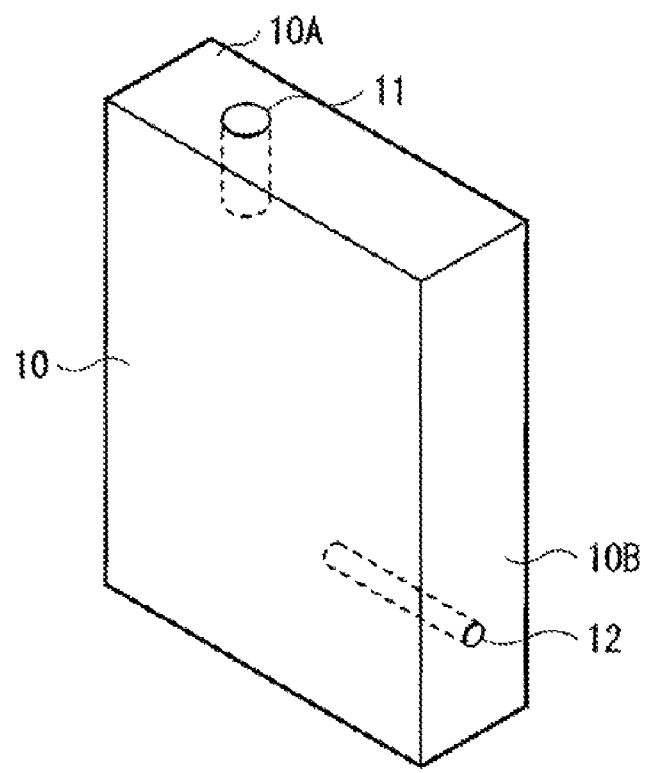
FIG. 8 is a diagram showing a modification of FIG. 6.
Figure 9:
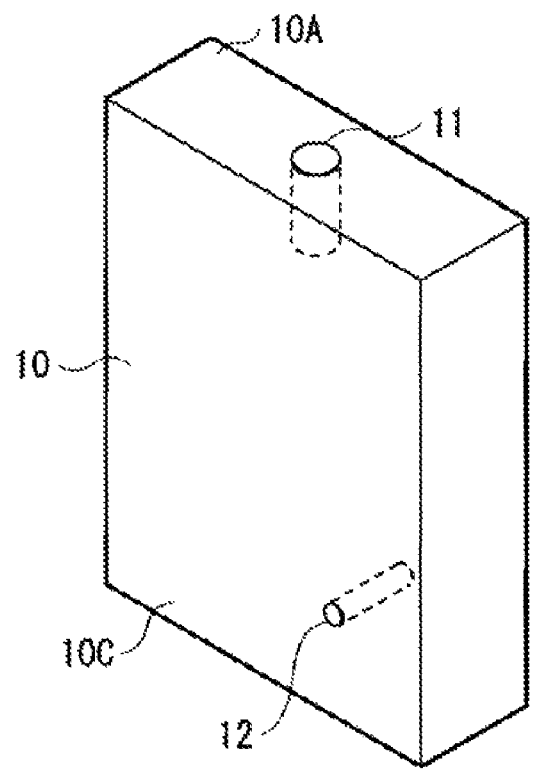
FIG. 9 is a diagram showing another modification of FIG. 6.

In an embodiment, the case where the fuel supply port 11 and the atmosphere communication port 12 are formed in the top face 10A of the cartridge body 10 has been described. The positions of the fuel supply port 11 and the atmospheric communication port 12 are not limited. The positional relations between the fuel supply port 11 and the atmosphere communication port 12 are not limited. For example, as shown in FIG. 8, the fuel supply port 11 may be provided in the top face 10A of the cartridge body 10, and the atmosphere communication port 12 may be provided in a side face 10B. For example, as shown in FIG. 9, the fuel supply port 11 may be provided in the top face 10A of the cartridge body 10, and the atmosphere communication port 12 may be provided in another side face 10C.

Figure 10:
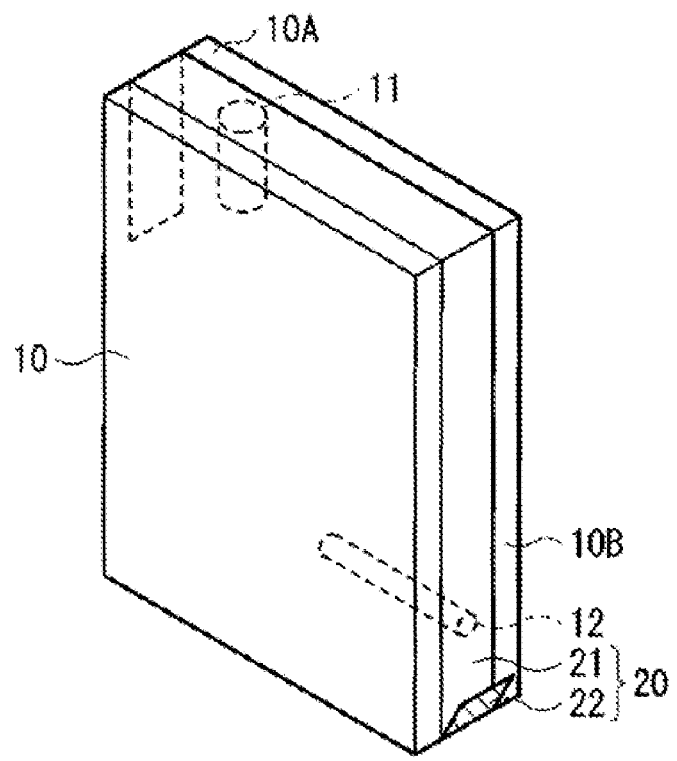
FIG. 10 is a diagram showing an example of the shape of a seal member adhered to the cartridge body illustrated in FIG. 8.
Figure 11:
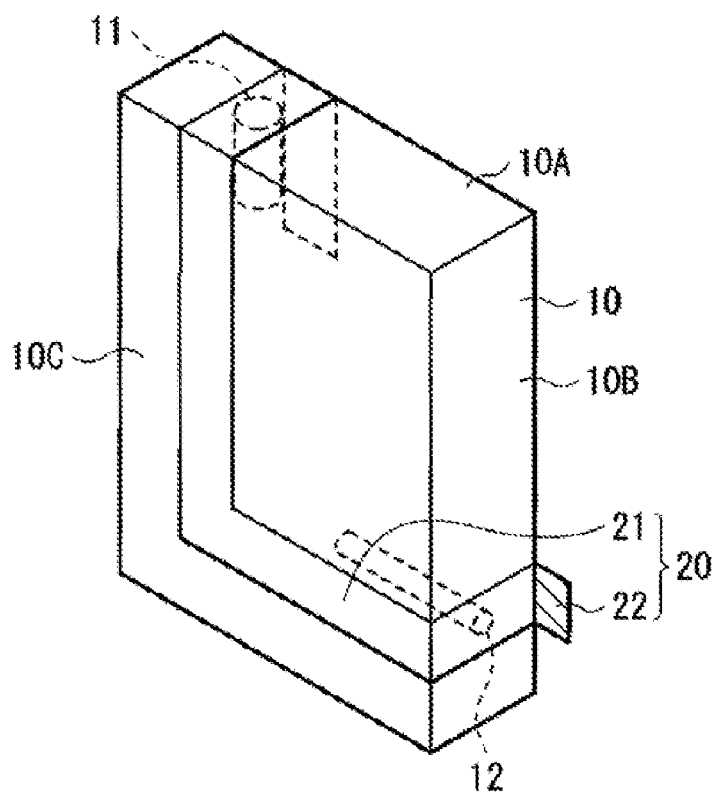
FIG. 11 is a diagram showing a modification of FIG. 10.
Figure 12:
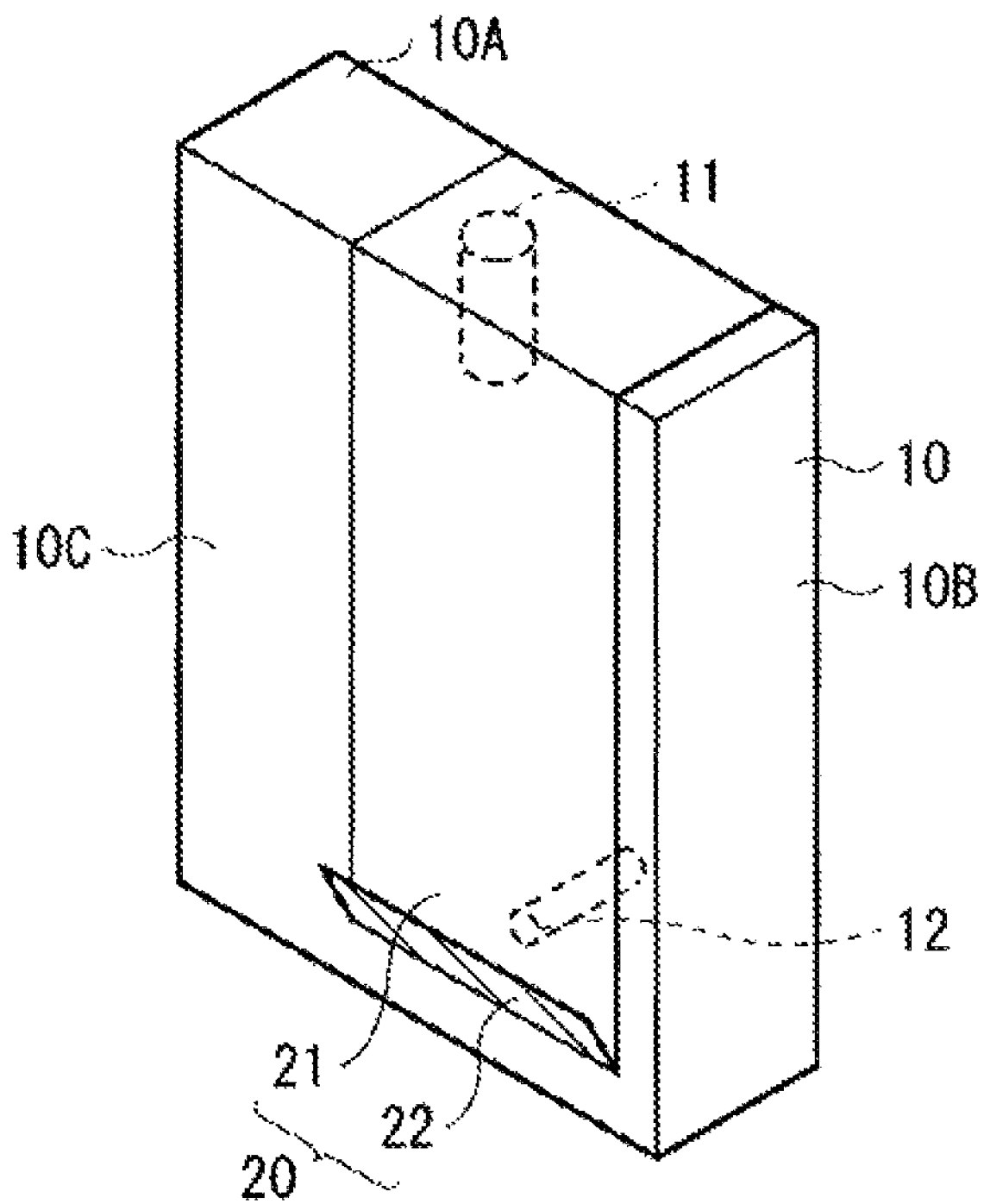
FIG. 12 is a diagram showing an example of the shape of the seal member adhered to the cartridge body illustrated in FIG. 9.

The shape of the seal member 20 is not limited as long as it can close both of the fuel supply port 11 and the atmosphere communication port 12 by one component member. For example, in the case of FIG. 8, the seal member 20 may be adhered to the top face 10A and the side face 10B of the cartridge body 10 as shown in FIG. 10, or the seal member 20 may be adhered to the top face 10A and the side faces 10C and 10B of the cartridge body 10 as shown in FIG. 11. In the case of FIG. 9, the seal member 20 may be adhered to the top face 10A and the side face 10C of the cartridge body 10 as shown in FIG. 12.

Although the present application has been described by using the embodiments, the present application is not limited to the foregoing embodiments but may be modified in a variety of suitable ways. For example, in the foregoing embodiments, the configurations of the cartridge body 10, the seal member 20, and the package member 30 have been concretely described. However, other configurations may be also employed. For example, the shape of the cartridge body 10 is not limited to the rectangular shape (rectangular parallelepiped) described in the embodiments but may be another shape such as a cylindrical shape.

For example, the materials and thicknesses of the components and the method of adhering the seal member 20 described in the foregoing embodiments are not limited. Other materials, other thicknesses, and other adhering methods may be employed.

Further, a liquid fuel contained in the cartridge body 10 is not limited to methanol but may be another liquid fuel such as ethanol or dimethyl ether.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A fuel cartridge comprising:
a cartridge body having a fuel supply port and an atmosphere communication port; and
a seal member for directly closing the fuel supply port,
wherein the seal member comprises a sealing part as a single component for covering both of the fuel supply port and the atmosphere communication port, and an operating part provided at one end of the sealing part and a distance L2 between the operating part and a second sealing part for sealing the atmosphere communication port is shorter than a distance L1 between the operating part and a first sealing part for sealing the fuel supply port; wherein a peel resistance of the second sealing part is lower than that of the first sealing part.

2. The fuel cartridge according to claim 1 further comprising a package member for housing the cartridge body.

3. The fuel cartridge according to claim 1, wherein the seal member directly closes the fuel supply port and the atmosphere communication port.

4. The fuel cartridge according to claim 1, wherein the sealing part is adhered to the fuel supply port by a method selected from the group consisting of: thermal fusion bonding, ultrasonic fusion bonding and resin adhesion using an adhesive.

5. The fuel cartridge according to claim 1, wherein the operating part applies a peeling force to the sealing part to peel the sealing part from the cartridge body.

6. The fuel cartridge according to claim 1 further comprising a package member surrounding the cartridge body.

7. A fuel cartridge comprising:
a cartridge body having a fuel supply port and an atmosphere communication port; and
a seal member for directly closing the fuel supply port,
wherein the seal member comprises a sealing part as a single component for covering both of the fuel supply port and the atmosphere communication port, and an operating part provided at one end of the sealing part and a distance L2 between the operating part and a second sealing part for sealing the atmosphere communication port is shorter than a distance L1 between the operating part and a first sealing part for sealing the fuel supply port; and a package member surrounding the cartridge body, wherein the package member is coupled to the operating part.

* * * * *